E. GRAF.
AUTOMATIC ADJUSTABLE BEARING.
APPLICATION FILED DEC. 23, 1916.
1,288,562.
Patented Dec. 24, 1918.
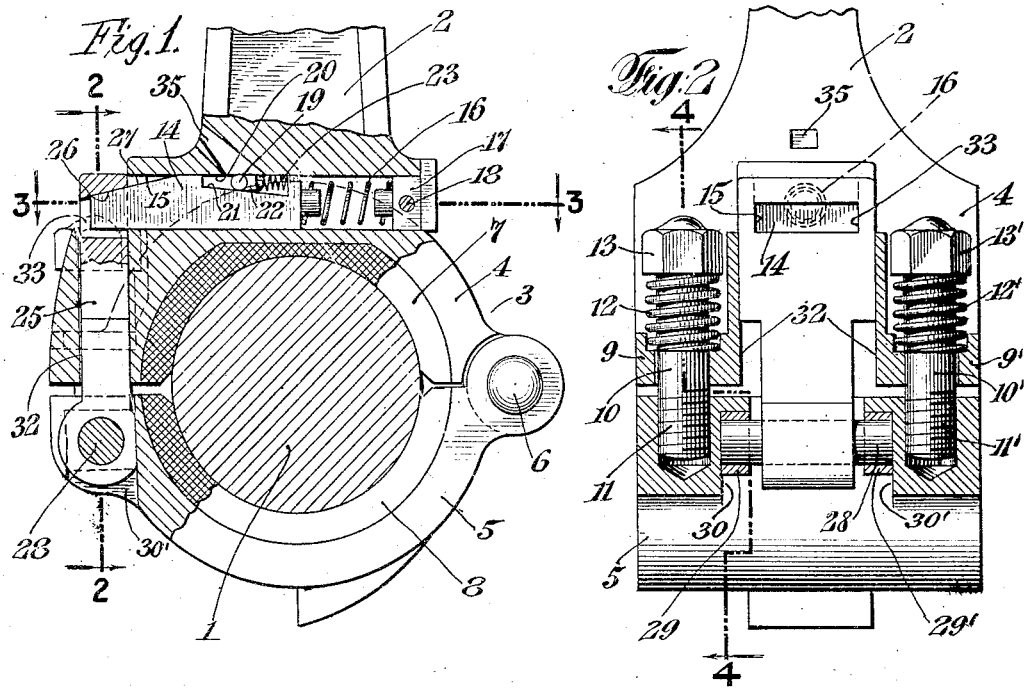
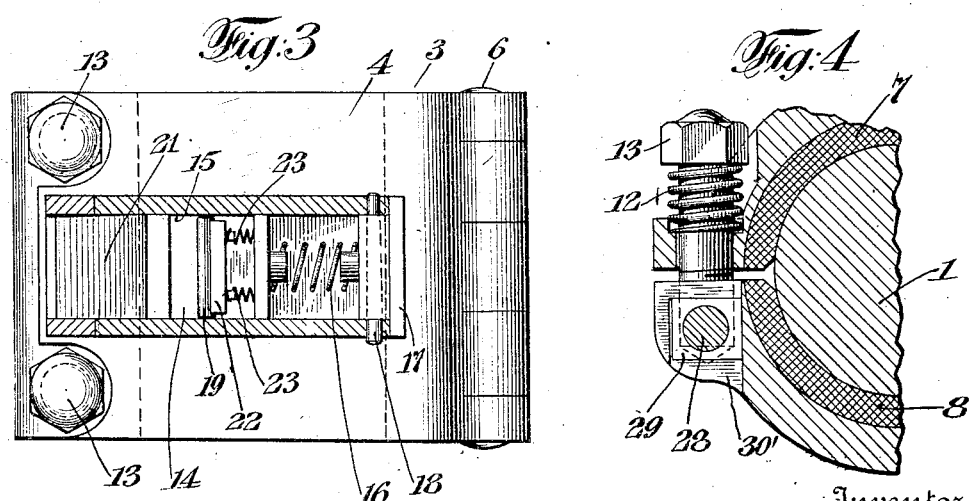
Inventor
Emil Graf
By his Attorneys
Kenyon & Kenyon

UNITED STATES PATENT OFFICE.

EMIL GRAF, OF NEW YORK, N. Y., ASSIGNOR, BY DIRECT AND MESNE ASSIGNMENTS, OF FIFTY AND ONE-HALF ONE-HUNDREDTHS TO CHARLES C. JAMES AND TWENTY-FOUR AND ONE-HALF ONE-HUNDREDTHS TO JANE D. CHAMPLIN, BOTH OF NEW YORK, N. Y.

AUTOMATIC ADJUSTABLE BEARING.

1,288,562.    Specification of Letters Patent.    Patented Dec. 24, 1918.

Application filed December 23, 1916. Serial No. 138,543.

*To all whom it may concern:*

Be it known that I, EMIL GRAF, a citizen of Switzerland, and a resident of the city, county, and State of New York, have invented certain new and useful Improvements in Automatic Adjustable Bearings, of which the following is a specification.

My invention relates to automatic adjustable bearings, and one of the objects of the invention is to provide a durable and efficient bearing of this character.

Another object of the invention is to provide a bearing of this kind especially useful as a connecting rod bearing by reason of a provision for preventing chattering or hammering in the bearing due to momentary separation of the bearing parts during the inward or outward stroke of the connecting rod.

Another object of the invention is to provide a bearing of the above character in which certain of the parts that effect the automatic adjustment are properly housed and so located that they may be readily accessible for inspection and repairs without disturbing the bearing proper.

A further object of the invention is to so locate the automatic adjustment parts with respect to the bearing, that they take up but little space, and are well protected from breakage or disarrangement due to the strains to which such parts are subjected.

Further objects and advantages of the invention will more fully appear from the following description taken in connection with the accompanying drawings showing the preferred embodiment of the invention.

The invention consists in the novel features of construction hereinafter described and more particularly pointed out in the appended claims.

Referring to the drawings,

Figure 1 is an end view, partly in section, of the connecting rod bearing embodying my invention;

Fig. 2 is a longitudinal section of the same taken on line 2—2 of Fig. 1;

Fig. 3 is a section taken on line 3—3 of Fig. 1; and

Fig. 4 is a section taken on line 4—4 of Fig. 2.

Referring to the drawings, 1 is a crank shaft to which is secured the connecting rod 2 having a bearing support 3 consisting of an upper bearing member 4 and a lower bearing member 5 hinged to the upper member at 6. The upper bearing member 4 is provided with the upper half 7 of the split bearing, the other half of the bearing, 8 being carried by the lower bearing member 5.

The front side of the upper bearing member 4 is provided with flanges 9, 9' having openings therethrough for receiving bolts 10, 10' which pass freely through these openings and are threaded into alined flanges 11, 11' in the lower bearing member, and these bolts are provided with compression springs 12, 12' surrounding the bolts and located between the heads of the bolts, 13, 13' and the said flanges 9, 9'. By means of these bolts and springs the two bearing members are held yieldably together, the springs 12, 12' acting to draw the lower bearing member upward toward the upper bearing member to compensate for wear on the bearings.

In order to hold the lower bearing member at all times as far up toward the upper bearing member as the springs 12, 12' force it during the downward stroke, and to thus prevent chattering of or looseness in the bearing and to take the strain off of the springs during the upward stroke and to assist if desired in moving the lower bearing member upward, the following means are provided: The upper bearing member 4 has mounted thereon a movable part such for example as a bolt member 14 (Figs. 1 and 3), slidably mounted in a guideway 15 cut transversely through the bearing member 4 just above the bearing 7, and this bolt member 14 is forced forward under the impulse of a compression spring, 16, the forward end of which rests against the bolt member and the rear end of which rests against a detachable plug 17 detachably pinned in position by a suitable pin or set screw 18. The bolt member is provided with a suitable check or locking device which permits it to move forward due to the spring, but prevents it from moving backward against the spring action; and in the present embodiment of the invention, this locking means consists of a hard steel roller 19 resting between the upper surface 20 of the bolt guideway and the adjacent inclined surface 21 of a cut-away portion of the bolt, and this roller is yieldably held in position on the inclined surface 21 by means of a follower 22 and a compression spring 23. By means of this device the bolt may move forward freely under the action of the spring 16; but the moment the bolt is forced against the spring action it is prevented from moving backward by reason of the wedging action of the roller 19 on the inclined surface 21. The hinged lower bearing member is provided with a part 25 extending upwardly therefrom to the bolt and being provided with a cam surface, preferably an inclined surface 26, adapted to be engaged by the cam surface, preferably an inclined surface 27, formed on the forward end of the bolt. In the particular embodiment of the invention shown, the part 25 is detachably secured to the lower bearing member in the following manner: It is freely mounted on a pin 28, and the ends of this pin (Figs. 2 and 4) are provided with sleeves 29, 29' rectangular in outward contour so as to make a ready and square fit in cut-away portions or pockets 30, 30' formed on the inner side of the bolt-receiving flanges of the lower bearing. The part 25 extends upwardly from the pin 28 through a suitable guide formed on the upper bearing member, and this guide, as shown in the present form of the invention, consists of a guideway 32 cut through the front of the bearing member 4 and in vertical alinement with the bolt 14. The upper end of the projecting part 25 as herein shown, has an opening 33 the upper surface of which provides the desired cam or inclined surface 26. By this construction, the tension strain on the member 25 is exerted centrally of the member, and the resultant lateral thrust on the member 25 due to the action of the inclined or wedging surfaces 26 and 27, is taken up by the relatively large and strong front portion of the bearing member 4. Likewise, it will be observed that the vertical thrusts or strains on the bolt member 14 are taken up by the relatively large parts of the upper bearing member 4, and said bolt member is guided firmly in its movements, and that the said bolt member and its impelling spring, together with its locking device, are all thoroughly inclosed within the guideway, but may be readily gotten at for inspection and repairs.

It will thus be seen that the wear in the bearing is automatically taken up during all intervals of downward stroke of the connecting rod, by the springs 12, 12' and by the wedge action of the engaging surfaces 26 and 27 under the force of spring 16, and that the bearings are prevented from chattering, hammering, or being momentarily separated during the upward stroke, by reason of the fact that the engaging surfaces 26 and 27 are held firmly together from lateral movement by reason of the locking roller 19.

It will be observed from the foregoing explanation of my invention that the extent to which the bolt spring 16 assists in actually drawing the two bearing members together, depends entirely upon the desired design of the parts. For example, if the springs 12, 12' are made relatively light, or even dispensed with, and the spring 16 back of the bolt member 14 made proportionately stronger and the engaging jam or inclined surfaces 26, 27 are not made too abrupt, the said spring 16 may be relied upon to force the bearing parts together; whereas, if the springs 12, 12' are made stronger, they to a greater extent perform the function of drawing the bearing members together and likewise the strength of the spring 16 may when desired be proportionately reduced. In the preferred form of my invention herein disclosed, I intend that the springs 12, 12' shall be the prime or main means of drawing the bearings together, since the full force of these springs acts directly for this purpose. And I then so design the spring 16 back of the sliding bolt member 14 that its main function is simply to force the said bolt member forward into firm engagement with the inclined surface 26, and the part it plays in actually drawing the two members together is comparatively small, and in some instances this spring need only be of sufficient strength to move the bolt forward into engagement with the surface 26.

When the bearing is to be taken apart, it is necessary to release the lock on the bolt member 14 so as to move the bolt backward in its guideway and thus release the projecting part 25 to permit the lower bearing member to swing downward; and to accomplish this, I provide some suitable means of getting at the spring 23 back of the locking roller 19 so as to compress the same and allow the roller to move down the inclined surface 21 to permit said bolt member 14 to be moved backward. In the present embodiment of the invention, this means consists of a narrow slot 35 cut through the top of the upper bearing member 4 to the guideway of said bolt. This slot is flaring so that a sharp tool may be projected therethrough and caused to engage the follower 22 of the roller 19 to force it backward against its spring 23, permitting the roller to move down the inclined surface, so that with or without the detachable plug 17 and the spring 16 removed, the bolt member 14 may thus be moved backward to release the bearing parts.

After understanding my invention, it will be obvious to those skilled in the art that various modifications and changes therein may be made without departing from the spirit or scope of the invention, and while I have described the invention with particularity in its preferred form, I aim in the appended claims to cover all such modifications and changes.

Having thus described my invention, what I claim as new and desire to secure by Letters Patent, is:—

1. In a device of the character described, the combination of a bearing support having a bearing therein divided longitudinally of its axis, said divided parts being adapted to be moved together to compensate for wear, means including a part movably mounted on the bearing support and provided with a cam engaging surface coöperating with one of the bearing parts for holding the bearing parts together, a spring for forcing said movably mounted part in one direction to hold the divided bearings closer together, and a locking device for preventing the return movement of said movable part against the spring, whereby the bearings are automatically forced together to compensate for wear and momentary separation of the same prevented during operation.

2. In a device of the character described, the combination of two bearing members one of which is movable toward the other to compensate for wear of the bearing, means including a part movably mounted on one of the bearing members and coöperating with a part on the other bearing member for holding and automatically moving the bearing members together as the bearing is worn, and means for preventing movement of the movably mounted part in a direction opposite to that in which it moves to hold the bearing members together but permitting its movement in a direction to move said bearing members together.

3. In a device of the character described, the combination of two bearing members one of which is movable toward the other to compensate for wear, means for automatically moving and holding the bearing members together to compensate for wear, said means comprising two relatively movable engaging parts and a spring, one of said engaging parts being mounted on one of the bearing members and one on the other bearing member, one of said engaging parts being movably mounted on its bearing member and movable by said spring toward the other engaging part, and a locking device coöperating with said movably mounted engaging part to prevent movement thereof away from the other engaging part while permitting it to move toward said other engaging part.

4. In a device of the character described, the combination of two bearing members one of which is movable toward the other to compensate for wear, a device slidably mounted on one bearing member and engaging a part carried by the other bearing member so as to hold said bearing members together, a spring for forcing the slidable device into engagement with its said engaging part, and means automatically preventing the return movement of the slidable device against said spring but permitting it to move responsive to the spring, whereby the wear of the bearing is automatically compensated for and the bearing members prevented from momentarily separating.

5. In a device of the character described, the combination of two bearing members one of which is movable toward the other to compensate for wear, a bolt member slidably mounted on one of said bearing members and having a spring for moving it in one direction, said bolt member having an inclined engaging surface, a part extending from the other bearing member to the bolt and having an inclined surface adapted to be engaged by the inclined surface of the bolt for holding the bearing members closer together to automatically compensate for wear as the bolt member is moved by the spring, and locking means for preventing the bolt member from moving against the spring but permitting said bolt member to move forward responsive to the spring.

6. In a device of the character described, the combination of two bearing members one of which is movable toward the other to compensate for wear, a bolt member slidably mounted on one of said bearing members and having a spring for moving it in one direction, said bolt member having an inclined engaging surface, means detachably secured to the other bearing member and extending therefrom to the bolt and having an inclined surface adapted to be engaged by the inclined surface of the bolt for forcing the bearing members closer together, and a guide on the first bearing member through which said detachably secured means extends to prevent lateral movement thereof.

7. In a device of the character described, the combination of two bearing members one of which is movable toward the other to compensate for wear, means for holding the bearing members together and automatically taking up the wear therein, and means coöperating with said last means to prevent said bearing members separating from the position to which they have been drawn together by said first means.

8. In a device of the character described, the combination of two bearing members one of which is movable toward the other to compensate for wear, a bolt member slidably mounted on the top bearing member to move transversely thereof and having a spring for moving it in one direction, said bolt member having an engaging surface, a part projecting from the other member and extending therefrom to the bolt, and having a surface adapted to be engaged by the engaging surface of the bolt for holding the bearing members closer together, at least one of said engaging surfaces being a cam surface, and locking means for preventing the bolt member from moving against the spring but permitting said bolt member to move forward responsive to the spring.

9. In a device of the character described, the combination of two bearing members one of which is movable toward the other to compensate for wear, a guideway in one of said bearing members, a bolt member slidably mounted therein and having an engaging surface, a spring acting on said bolt member to move it forward, means detachably secured to the second bearing member and extending to the bolt and having a surface at its free end adapted to be engaged by the engaging surface of the bolt, at least one of said engaging surfaces being a cam surface, a guide in the first bearing member through which said detachable means extends to prevent lateral movement thereof, and locking means operatively related to said bolt member to prevent its movement against the spring but permitting its movement in the direction in which the spring forces it.

10. In a device of the character described, the combination of two bearing members one of which is movable toward the other to compensate for wear, a guideway in one of said bearing members, a bolt member slidably mounted therein and having an inclined engaging surface, a spring within said guideway at the rear of the bolt member and acting thereon to move it forward, means detachably secured to the second bearing member and extending to the bolt and having at its free end an opening therein into which the forward end of the bolt projects, with an inclined surface adapted to be engaged by the inclined surface of the bolt, a guide in the first bearing member through which said detachable means extends to prevent lateral movement thereof, and locking means within the guideway of the first-mentioned bearing member coöperating with said bolt member to prevent movement of the bolt against the spring but permitting its movement in the forward direction, said locking means comprising a roller lying between a surface of the bolt and an adjacent surface of the guideway, one of which is inclined, and yieldable means for holding said roller in position on the inclined surface.

11. In a bearing, the combination of two bearing members one of which is hinged to the other so as to be movable to compensate for wear, a plurality of bolts passing slidably through a part of one of said bearing members and threaded into the other bearing member and springs surrounding the bolts and located between the heads thereof and the adjacent bearing member to hold the bearing members yieldably together, a guideway in one of said bearing members, a bolt member slidably mounted therein and having a cam engaging surface, a spring acting on said bolt member to move it forward, and means secured to the second bearing member and extending to the bolt and having a surface at its free end adapted to be engaged by the cam surface of the bolt.

12. In a bearing, the combination of two bearing members one of which is hinged to the other so as to be movable to compensate for wear, a plurality of bolts passing slidably through a part of one of said bearing members and threaded into the other bearing member and springs surrounding the bolts and located between the heads thereof and the adjacent bearing member to hold the bearing members yieldably together, a guideway in one of said bearing members, a bolt member slidably mounted therein and having a cam engaging surface, a spring acting on said bolt member to move it forward, means secured to the second bearing member and extending to the bolt and having a surface at its free end adapted to be engaged by the cam surface of the bolt, a guide in the first bearing member through which said detachable means extends to prevent lateral movement thereof, and locking means operatively related to said bolt member to prevent its movement against the spring but permitting its movement in the direction in which the spring forces it.

13. In a device of the character described, the combination of a bearing support having a bearing therein divided longitudinally of its axis, said divided parts being adapted to be moved together to compensate for wear, means for moving the divided parts of the bearing closer together and holding them together, said means including one or more springs acting to draw the said bearing parts closer together and a part movably mounted on the bearing support and provided with a cam engaging surface coöperating with one of the bearing parts for holding the bearing parts together and a spring for forcing said movably mounted part in one direction to hold the divided bearings closer together.

14. In a device of the character described, the combination of two bearing members one of which is movable toward the other to compensate for wear, means for moving said bearing members closer together and for holding them together, said means including one or more springs acting to force the said bearing members together and a device slidably mounted on one bearing member and engaging a part carried by the other bearing member so as to hold said bearing members together and a spring for forcing the slidable device into engagement with its said engaging part, and means automatically preventing the return movement of the slidable device against said last spring but permitting it to move responsive to said last spring.

15. In a device of the character described, the combination of two bearing members one of which is movable toward the other to compensate for wear, means including one or more springs acting to force said bearing members closer together, a bolt member slidably mounted on one of said bearing members and having a spring for moving it in one direction, said bolt member having an engaging surface and a part projecting from the other member and extending therefrom to the bolt, and having a surface adapted to be engaged by the engaging surface of the bolt for holding the bearing members closer together, at least one of said engaging surfaces being a cam surface.

In testimony whereof, I have signed my name to this specification.

EMIL GRAF.